United States Patent Office 3,210,393
Patented Oct. 5, 1965

3,210,393
16β-METHYLDESOXYCORTICOSTERONE
21-ACETATE
Giangiacomo Nathansohn, Milan, Italy, and Emilio Testa,
Tessin, Switzerland, assignors to Lepetit S.p.A., Milan,
Italy, an Italian body corporate
No Drawing. Filed Nov. 20, 1962, Ser. No. 239,054
Claims priority, application Great Britain, Dec. 18, 1961,
45,344/61
1 Claim. (Cl. 260—397.47)

The invention relates to a new pharmacologically active compound and to a process for manufacturing the same.

The new compound of the invention is 16β-methyldesoxycorticosterone 21-acetate of the formula:

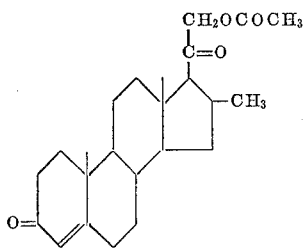

This new compound possesses hypertensive activity but surprisingly, unlike desoxycorticosterone, has substantially no effect on electrolyte metabolism.

The process of the invention for producing the above-mentioned compound comprises treating pregna-5,16-diene-3β,21-diol-20-one 21-acetate with diazomethane, heating the 16α,17α-diazomethylene derivative obtained at 140–170° C., hydrogenating the resulting 16β-methyl-pregna-5,16-diene-3β,21-diol-20-one 21-acetate to 16β-methyl-pregna-5-ene-3β,21-diol-20-one 21-acetate and converting the last mentioned compound to 16β-methyl-desoxycorticosterone acetate.

The reaction scheme is as follows:

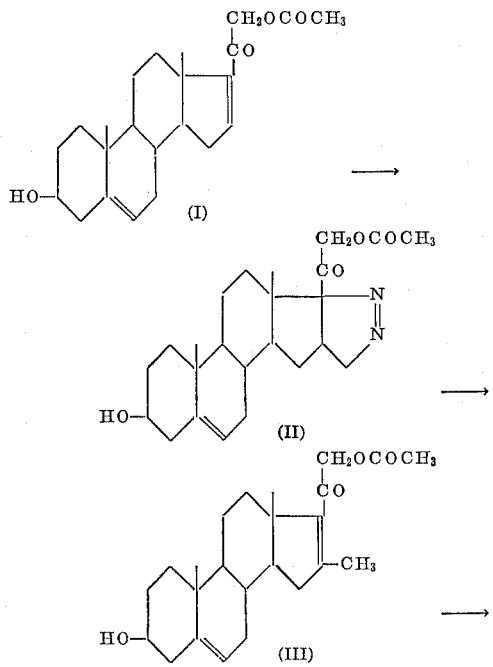

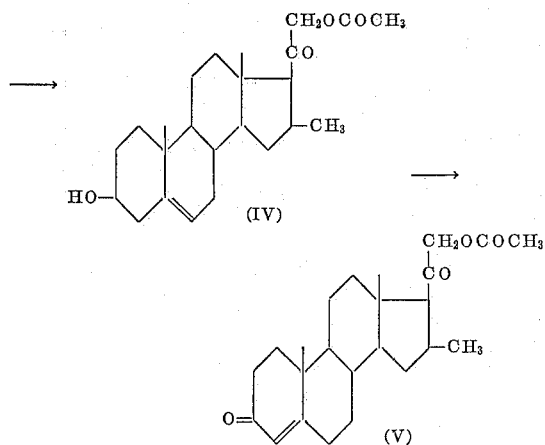

The production of the new steroid is illustrated by the following example:

EXAMPLE 1

*16α,17α-diazomethylene-pregn-5-ene-3β,21-diol-20-one 21-acetate (compound II)*

To a solution of 25 g. of pregna-5,16-diene-3β,21-diol-20-one 21-acetate in 300 ml. of tetrahydrofuran, chilled to −10° C., a dry ether solution of diazomethane, prepared from 100 g. of nitrosomethylurea, is slowly added. After one hour the temperature is allowed to rise to +5° C. and the solution stored overnight at 5° C. Evaporation to dryness gives 27.7 g. of the crystalline compound II, M.P. 165–169° C. which is sufficiently pure for the next step. A small amount is purified by crystallization from acetone giving an analytically pure sample; M.P. 179–180° C.; $[\alpha]_D^{20}$ −24.3 (c.=0.946, $CHCl_3$); I.R. (Nujol mull): 3465 (OH), 1753 (C=O), 1556 (N=N) cm.$^{-1}$.

Analysis.—Calculated for $C_{24}H_{34}O_4N_2$: C, 69.55; H, 8.27; N, 6.76. Found: C, 69.70; H, 8.48; N, 6.86.

*16-methyl-pregna-5,16-diene-3β,21-diol-20-one 21-acetate (compound III)*

A suspension of 25.7 g. of compound II (M.P. 165–169°) in 130 ml. of paraffin oil is slowly heated with effective stirring to 160° C. At this temperature nitrogen evolution takes place and continues spontaneously without any additional heating; the temperature reaches 165° C. As soon as the evolution of gas stops, the solution is cooled while stirring down to 90° C. and treated with 190 ml. of hexane. The product which separates on cooling is collected, washed once more with hexane and dried: 28.7 g.; M.P. 160–172° C. The raw material is recrystallized up to a constant melting point. Yield 14.5 g. (63% of theory); M.P. 187–190° C.; $[\alpha]_D^{20}$ −85° (c.=0.954, $CHCl_3$); $\lambda_{max}$ 252 mμ ($C_2H_5OH$); ε (mol.) 8400; I.R. (Nujol mull): 3465 (OH), 1753 ($O.COCH_3$), 1660 (20 C=O), 1596 (C=C) cm.$^{-1}$.

Analysis.—Calculated for $C_{24}H_{34}O_4$: C, 78.82; H, 8.88. Found: C, 74.66; H, 8.96.

*16β-methyl-pregn-5-ene-3β,21-diol-20-one 21 acetate (compound IV)*

A solution of 10.8 g. of compound III in 2200 ml. of methanol is treated with 20 g. of Raney-nickel and shaken with $H_2$ at room temperature and normal pressure till any gas adsorption stops. The catalyst is filtered off and the solution evaporated to dryness. The crude oil is dissolved in acetone and evaporated to dryness in vacuo. The white solid product is dissolved in 100 ml. of ether and the solution filtered and evaporated till cloudiness appears. After storage at 5° C., 7.2 g. of compound IV are collected: M.P. 135–142° C. A small sample is recrystallized several times till analytically pure. M.P. 150–152° C.; $[\alpha]_D^{20}$ +0.2 (c.=0.5, CHCl$_3$). I.R. (Nujol mull): 3540 broad (OH), 1747 (OCOCH$_3$), 1720 (C=O) cm.$^{-1}$.

*Analysis.*—Calculated for $C_{24}H_{36}O_4$: C, 74.21; H, 9.34. Found: C, 73.95; H, 9.78.

*16β-methyl-pregn-4-ene-21-ol-3,20-dione 21-acetate (compound V)*

A solution of 5.2 g. of compound IV in 145 ml. of toluene and 43 ml. of cyclohexanone is distilled to remove 15 ml. of toluene and a solution of 2 g. aluminium isopropoxide in 16 ml. of toluene is added thereto. The mixture is refluxed for 3 hours, then cooled and washed with a saturated solution of Seignette salt, then with diluted NaOH solution and eventually with water. The organic phase is dried over Na$_2$SO$_4$, evaporated to dryness and extracted several times with hot petroleum ether. After drying in vacuo the oily residue is slurried with ether; 1 g. of compound V, M.P. 133–140° C. can be separated. The remaining oil is dissolved in benzene and passed through a column of Al$_2$O$_3$ (50 g.); the elution is conducted with benzene. The first 200 ml. fraction is evaporated and the oily residue (3.2 g.) slurried with petroleum ether. An additional crop of compound V, 1054 mg., M.P. 130–138° C., is obtained. Both crops—2.05 g.—are crystallized from methanol. Yield: 1.9 g.; M.P. 142–144° C.; $[\alpha]_D^{20}$ +148 (c.=0.925, dioxane); $\lambda_{max}$ 241 m$\mu$ (CH$_3$OH).

*Analysis.*—Calculated for $C_{24}H_{34}O_4$: C, 74.58; H, 8.81. Found: C, 74.57; H, 8.71.

We claim:

16β-methyldesoxycorticosterone 21-acetate.

References Cited by the Examiner

UNITED STATES PATENTS

| | | | |
|---|---|---|---|
| 3,009,936 | 11/61 | Hershberg et al. | 260—397.47 |
| 3,054,725 | 9/62 | Ilavsky et al. | 260—397.47 |
| 3,067,217 | 12/62 | Muller et al. | 260—397.47 |

OTHER REFERENCES

Taub et al.: J. Amer. Chem. Soc., vol. 80, No. 16, Aug. 20, 1958, p. 4435.

LEWIS GOTTS, *Primary Examiner.*